(12) United States Patent
Jung

(10) Patent No.: US 6,545,451 B2
(45) Date of Patent: Apr. 8, 2003

(54) LOAD-DEPENDENT FREQUENCY MODULATION CIRCUIT AND METHOD FOR SWITCHING POWER SYSTEM

(75) Inventor: Wang Kuo Jung, Taipei (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 09/940,357

(22) Filed: Aug. 27, 2001

(65) Prior Publication Data

US 2002/0027428 A1 Mar. 7, 2002

(51) Int. Cl.[7] .................... G05F 1/40; H02M 3/335
(52) U.S. Cl. ............................. 323/283; 363/20
(58) Field of Search ................ 323/283, 282, 323/284, 286; 363/16, 17, 37, 41, 20, 21.01, 19

(56) References Cited

U.S. PATENT DOCUMENTS 5,814,903 A  *  9/1998  Wu ......................... 307/125
5,999,421 A  * 12/1999  Liu ......................... 363/16
6,229,716 B1 *  5/2001  Preller ..................... 363/19

* cited by examiner

Primary Examiner—Rajnikant B. Patel
(74) Attorney, Agent, or Firm—J.C. Patents (57) ABSTRACT

A load-dependent frequency modulation circuit and a method thereof for a switching power system. The load-dependent frequency modulation circuit has a control integrated circuit, a feedback circuit and a clock control generator. The control integrated circuit has a clock signal generation terminal and a feedback input terminal. The clock signal generation terminal is used to generate a clock signal. The feedback circuit processes the output of the switching power system, and feedbacks the processed feedback signal to the feedback input terminal. The clock control generator is electrically connected to the feedback input terminal. According to the control signal generated by variation of the feedback signal, the clock frequency at the clock signal generation terminal is adjusted.

10 Claims, 7 Drawing Sheets

LOAD-DEPENDENT FREQUENCY MODULATION CIRCUIT AND METHOD FOR SWITCHING POWER SYSTEM

CROSS-REFERENCE TO RELATED APPLICATION

This application claims the priority benefit of Taiwan application Ser. No. 89117336, filed Aug. 28, 2000.

BACKGROUND OF THE INVENTION

1. Field of the Invention

The invention relates in general to a switching power system, and more particularly, to a load-dependent frequency modulation circuit and a method thereof for a switching power system.

2. Description of the Related Art

The typical switching power system has a constant frequency. That is, to deal with the surge load requirement, the system is directly designed to be able to withstand larger load. Such design has to increase the capacitance of the energy converter (such as a transformer, inductor and capacitor), or to increase the operation frequency to carry the surge load. However, the volume is enlarged and the overall efficiency is decreased. Further, other problems such as noise and cost control are caused.

When the opposite condition occurs, that is, when the switching power system is having a light load or no load, a power saving requirement pops up. To satisfy the requirement, the conventional method is to switch the power system to a low operation frequency mode directly to reduce the energy loss.

Figure 1:
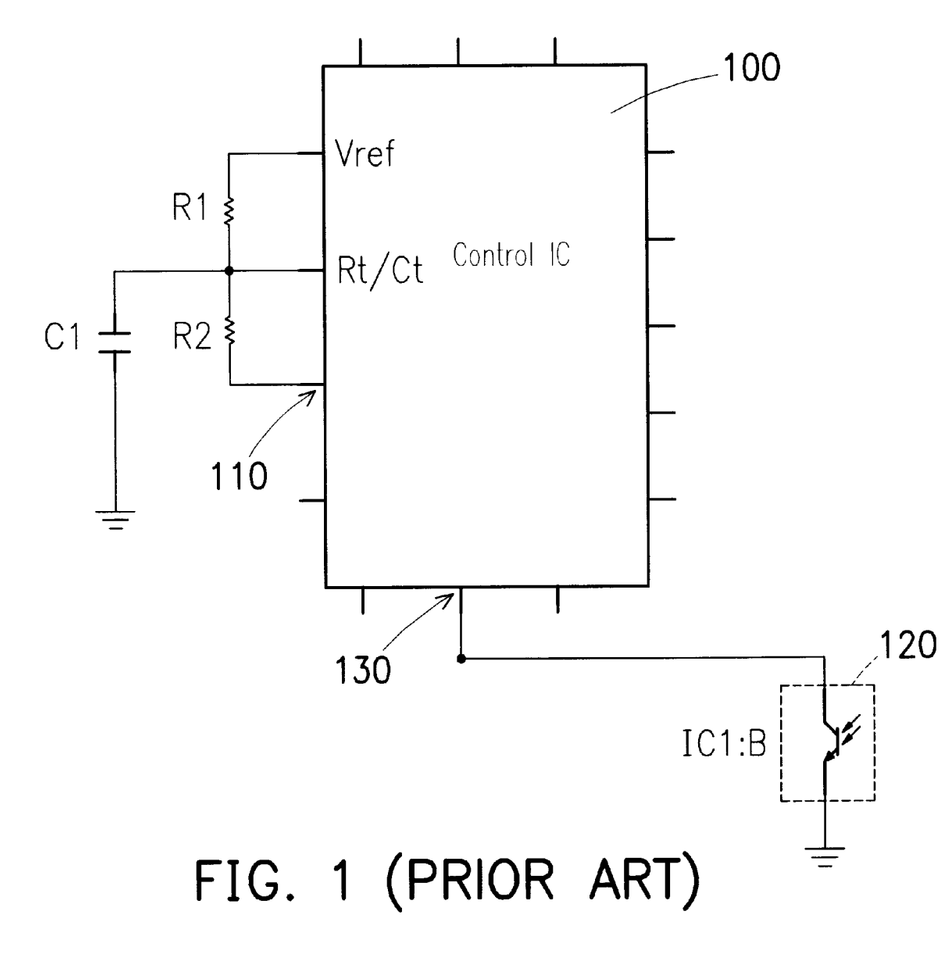
FIG. 1 shows a control integrated circuit and an external related circuit used in the prior art.

FIG. 1 shows the control integrated circuit (IC) 100 and the external related circuit used for a conventional switching power system. Being processed, the output of the switching power system is transmitted to the feedback input terminal 130 via the feedback circuit 120. By the feedback process, the control integrated circuit 100 obtains the load condition and adjusts the output energy of the system. When the system load is larger than a predetermined value (adjusted by the designer), the voltage at the pin 110 of the control integrated circuit 100 is switched to 5V causing a higher operation frequency. When the system load is smaller than the predetermined value, the voltage at the pin 110 has high impedance (High$_{13}$Z) causing a lower operation frequency. This method can only switch between two steps of higher and lower frequencies. Oscillation is easily caused during switching. The requirement of effectively satisfying the surge load and power saving is not met.

Therefore, the conventional technique has the following drawbacks:

1. The conventional technique directly designs the system into a surge load status. That is, the capacitance of the energy converter is enlarged. The system volume is thus increased with a reduced system efficiency. In addition, other problems such as noise and cost control are caused.
2. The switching power system has only two operation frequencies and easily causes oscillation during switching. Further, the requirement to satisfy both surge load and power saving cannot be met effectively.

SUMMARY OF THE INVENTION

The invention provides a load-dependent frequency modulation circuit for a switching power system. The modulation circuit has a control integrated circuit, a feedback circuit and a clock control generator. The control integrated circuit includes a clock signal generation terminal and a feedback input terminal. The clock signal generation terminal is to generate a clock signal. The feedback circuit is to process the output of the switching power system. The processed feedback signal is fed back to the feedback input terminal. The clock control generation circuit is electrically coupled to the feedback input terminal to adjust the clock frequency of the clock signal generation terminal according to the variation of the feedback signal.

The above clock control circuit may also comprise a clock control circuit and a clock generation circuit. The clock control circuit may further include a sampling circuit and a frequency adjust circuit. The sampling circuit outputs the sampling result obtained from sampling the feedback signal. The frequency adjust circuit receives the sampling result from the sampling circuit. According to the sampling result, the control signal output to the clock generation circuit is adjusted.

The invention also provides a load-dependent modulation method for a switching power system with a control integrated circuit. The control integrated circuit has a clock signal generation terminal. A feedback signal is obtained from the output of the switching power system. According to the feedback signal, the clock frequency of the clock signal generation circuit is adjusted.

According to the invention, a clock control circuit is used to combine with the feedback circuit in the system, so as to change the clock frequency of the control integrated circuit. Thus, the clock frequency is correlated to the output load, so that the switching power system may automatically adjust the operation frequency according to the variation of the load.

Both the foregoing general description and the following detailed description are exemplary and explanatory only and are not restrictive of the invention, as claimed.

DESCRIPTION OF THE PREFERRED EMBODIMENTS

Figure 2:
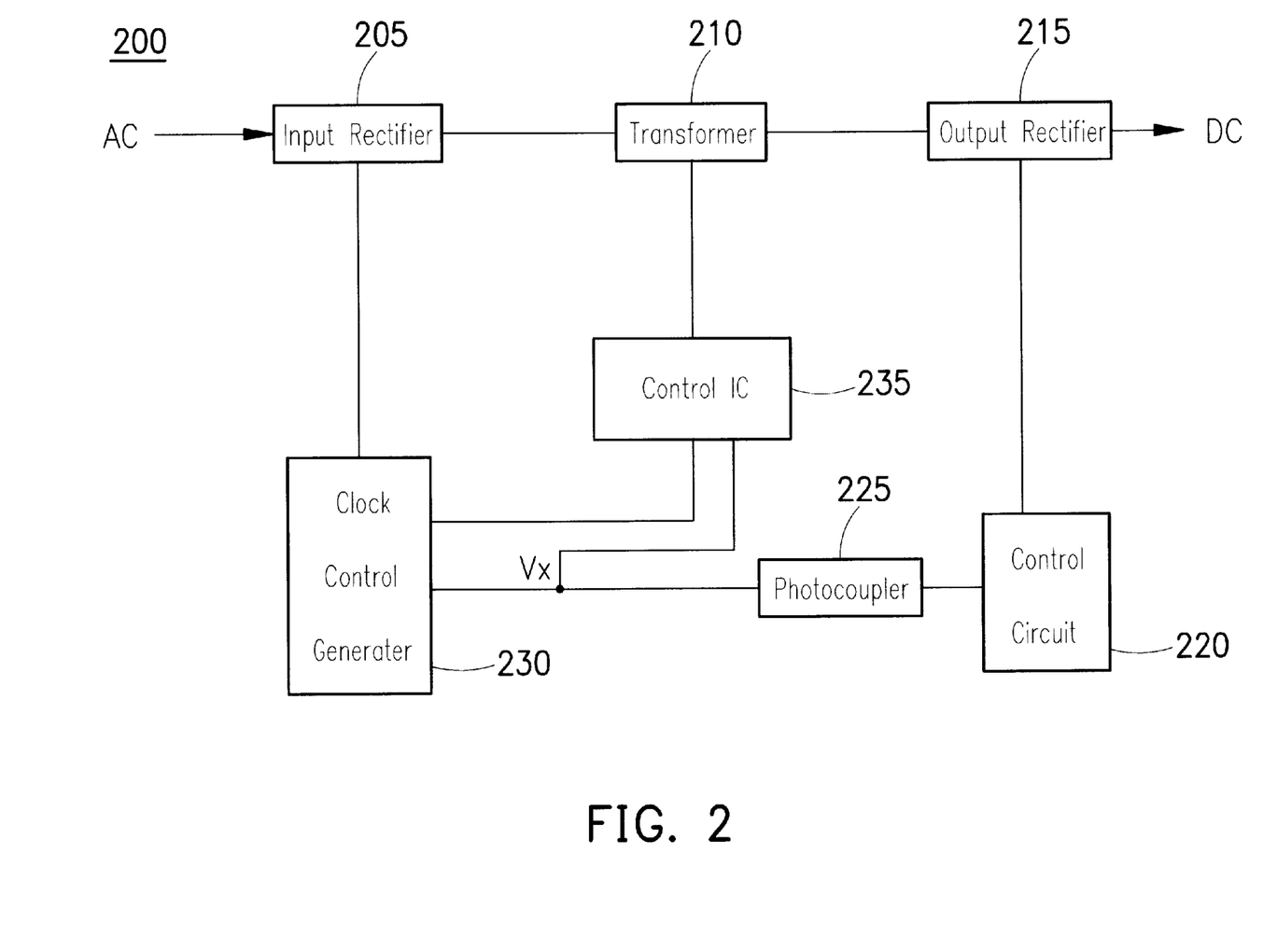
FIG. 2 shows a block diagram of the clock control circuit and the control integrated circuit.

FIG. 2 shows the system block diagram according to the invention. The switching power system 200 includes an input rectifier 205, a transformer 210, an output rectifier 215, a control circuit 220, a photo-coupler 225, a clock control generation circuit 230 and a control integrated circuit 235. An AC voltage provided by a power source AC is filtered and rectified by the input rectifier 205 before being transmitted to the transformer 210. Being filtered and rectified by the output rectifier 215, the AC voltage is output as a direct current (DC) output voltage. The control circuit 220 and the photo-coupler 225 are assembled as a feedback circuit. Being processed by the feedback circuit, the output of the switching power system 200 is converted into a feedback signal transmitted to the control integrated circuit 235. In addition, the clock control generation circuit 230 adjusts the clock frequency generated by the control integrated circuit 235 according to the feedback signal.

Figure 3:
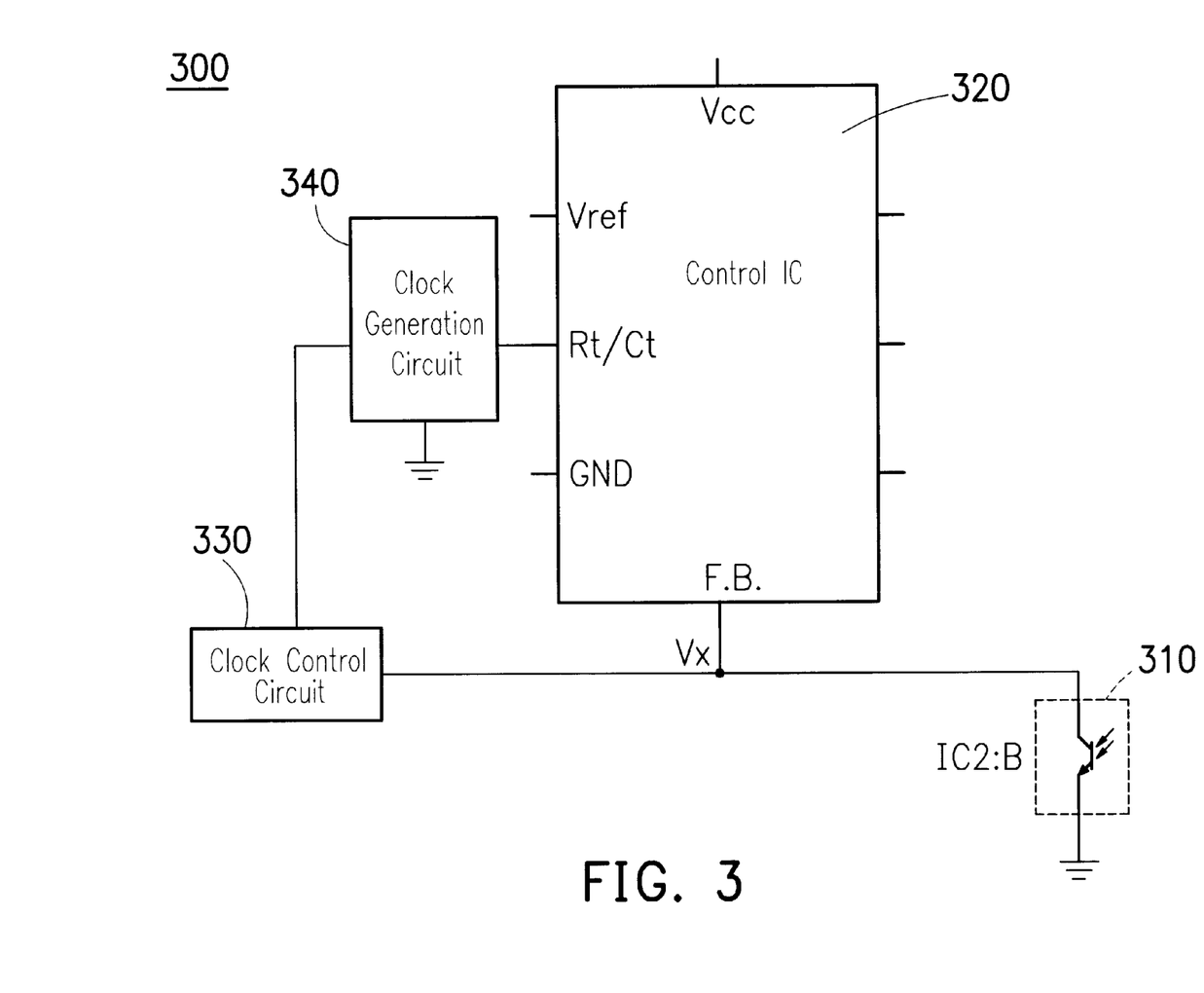
FIG. 3 shows the load-dependent frequency modulation circuit in a first embodiment of the invention.

FIG. 3 shows the connection between the clock control circuit and the control integrated circuit. The load-dependent frequency modulation circuit 300 includes a control integrated circuit 320, a clock control circuit 330 and a clock generation circuit 340. In addition, for the convenience of description, the above feedback circuit is represented by a photo-coupler 310 in this example. The feedback circuit (photo-coupler 310) feeds back a feedback signal Vx to the feedback terminal FB of the control integrated circuit 320 by processing the output of the switching power system. The clock control circuit 330 further changes the output control signal according to the feedback signal Vx. The clock generation circuit 340 is electrically coupled to the clock control circuit 330 to receive the control signal, and adjust the clock frequency of the clock signal generation terminal Rt/Ct according the control signal.

Figure 4:
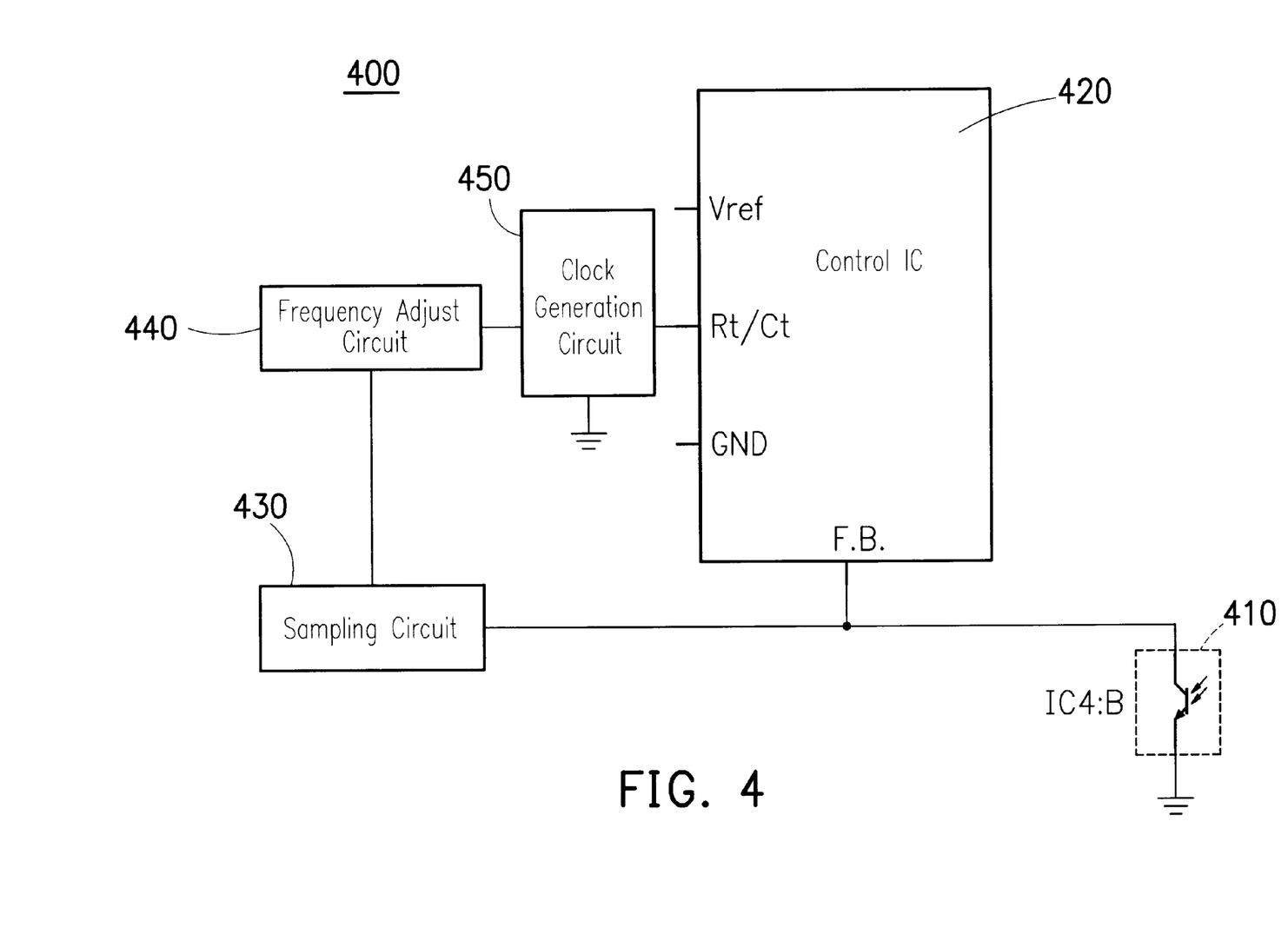
FIG. 4 shows the load-dependent frequency modulation circuit in a second embodiment of the invention.

FIG. 4 shows the connection between the clock control circuit and the control integrated circuit. The load-dependent frequency modulation circuit 400 comprises a control integrated circuit 420, a sampling circuit 430, a frequency adjust circuit 440 and a clock generation circuit 450. The sampling circuit 430 has one terminal electrically coupled to the feedback terminal FB, and the other terminal electrically coupled to the frequency adjust circuit 440 to sample the feedback signal at the feedback terminal FB. The frequency adjust circuit 440 has one terminal electrically connected to the sampling circuit 430, and the other terminal electrically connected to the clock generation circuit 450. In addition, the clock generation circuit 450 generates a clock at the clock signal terminal Rt/Ct. According to the sampling result of the sampling circuit 430, the frequency adjust circuit 440 adjusts the control signal output to the clock generation circuit 450.

Figure 5:
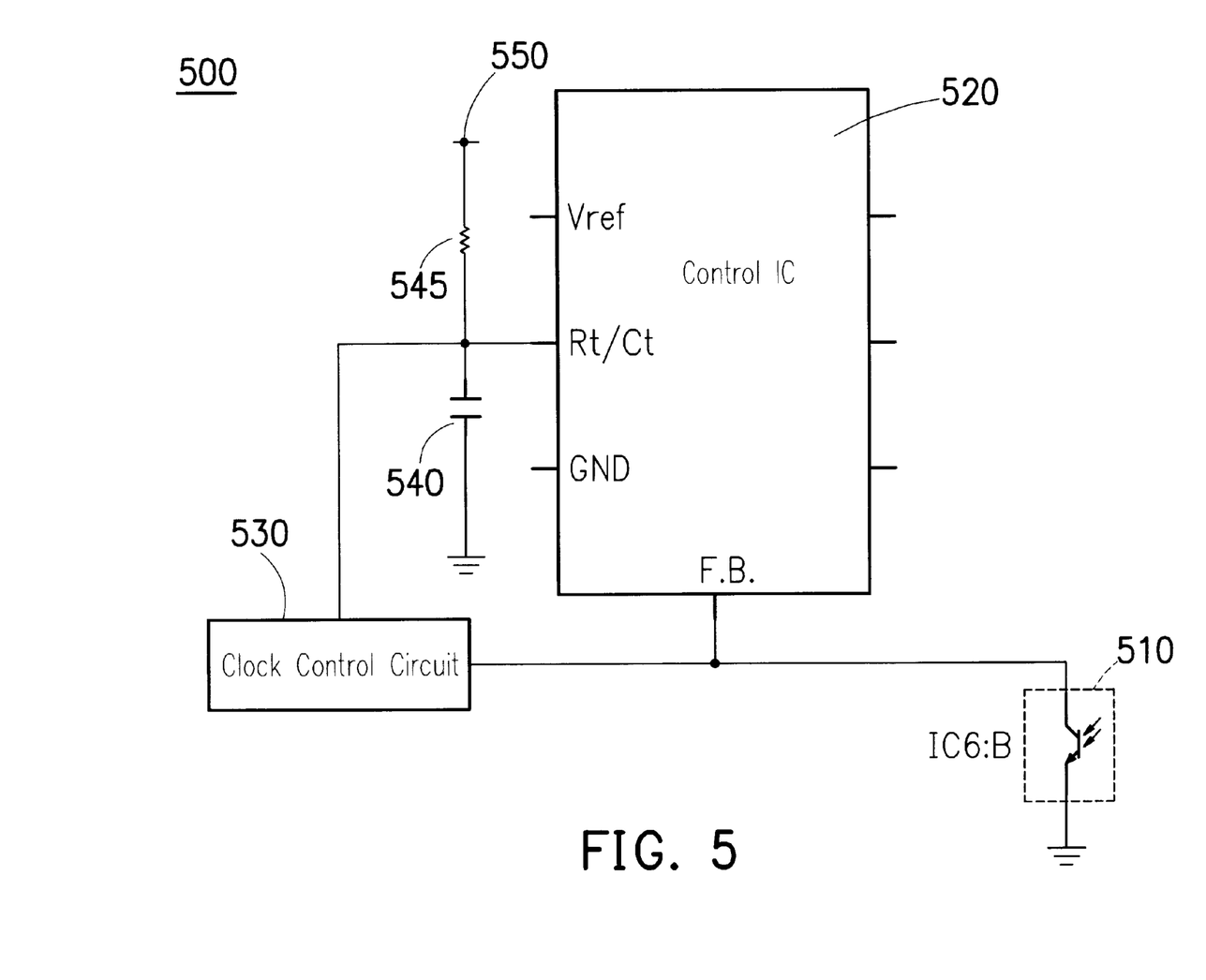
FIG. 5 shows the load-dependent frequency modulation circuit in a third embodiment of the invention.

FIG. 5 shows an embodiment of a load-dependent frequency modulation circuit. The load-dependent frequency modulation circuit 500 comprises a control integrated circuit 520, a clock control circuit 530, and a resistor-capacitor (RC) circuit functioning as the clock generation circuit 340. The RC circuit has a resistor 545 and a capacitor 540. Two terminals of the resistor 545 are coupled to a reference voltage node 550 and the clock signal generation terminal Rt/Ct and the capacitor 540. The other terminal of the capacitor 540 is coupled to ground. In addition, for the convenience of description, the above feedback circuit is represented by a photo-coupler 510 in this embodiment. As the clock control circuit 530 outputs a control signal according to the feedback signal, and the output control signal is directly superposed over the resistor 545, the capacitor 540 and the clock signal generation terminal Rt/Ct are electrically coupled to the clock signal. Thus, when the feedback signal is increased to cause an increment of the control signal, the frequency of the clock signal generated at the clock signal generation terminal Rt/Ct is increased. In contrast, when the feedback signal is decreased to cause a reduction in control signal, the frequency of the clock signal generated at the clock signal generation terminal Rt/Ct is decreased. In this manner, the feedback signal can control the frequency of the clock signal.

Figure 6:
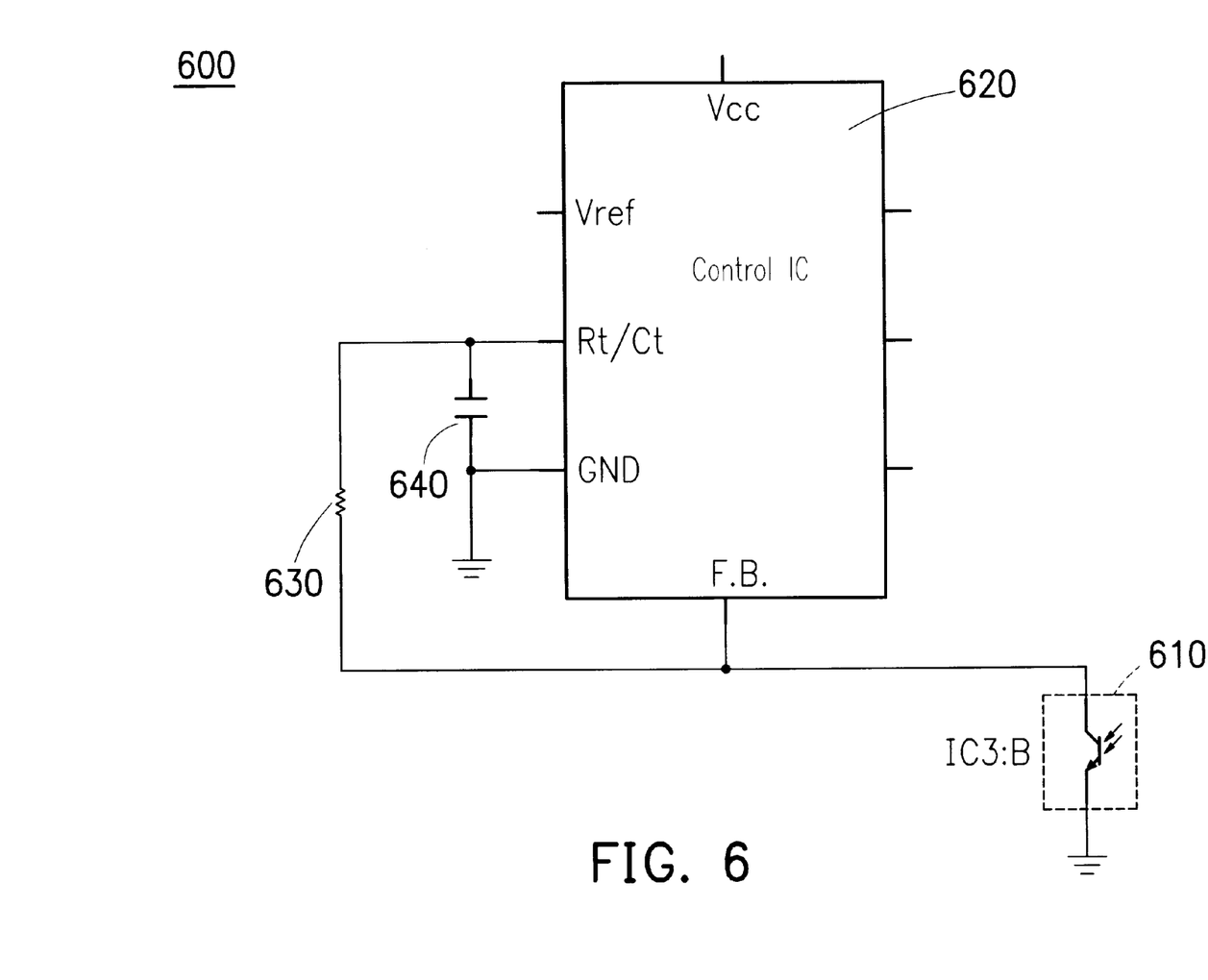
FIG. 6 shows the load-dependent frequency modulation circuit in a fourth embodiment of the invention.

FIG. 6 shows a second embodiment of a load-dependent frequency modulation circuit according to the invention. The load-dependent frequency modulation circuit 600 comprises a control integrated circuit 620, a resistor 630 and a capacitor 640. The resistor 630 is the clock control circuit 330, while the resistor 630 and the capacitor 640 together are equivalent to the clock generation circuit 340 as shown in FIG. 3. The feedback circuit is represented by a photo-coupler 610 as an example. As the feedback signal fed back by the feedback circuit (photo-coupler 610) is proportional to the output load of the switching power system, when the load is large, the feedback signal is high (with a certain maximum value). In contrast, when the load is small, the feedback signal is low. The feedback signal affects the clock signal generation terminal Rt/Ct of the control integrated circuit 620 via the clock control circuit (the resistor 630), varying the operation voltage of the clock generation circuit (the resistor 630 and the capacitor 640). When the load is large, and the feedback signal has a high voltage level, the clock frequency is high. In contrast, when the load is small, and the voltage of the feedback signal is low, the clock frequency is low.

Figure 7:
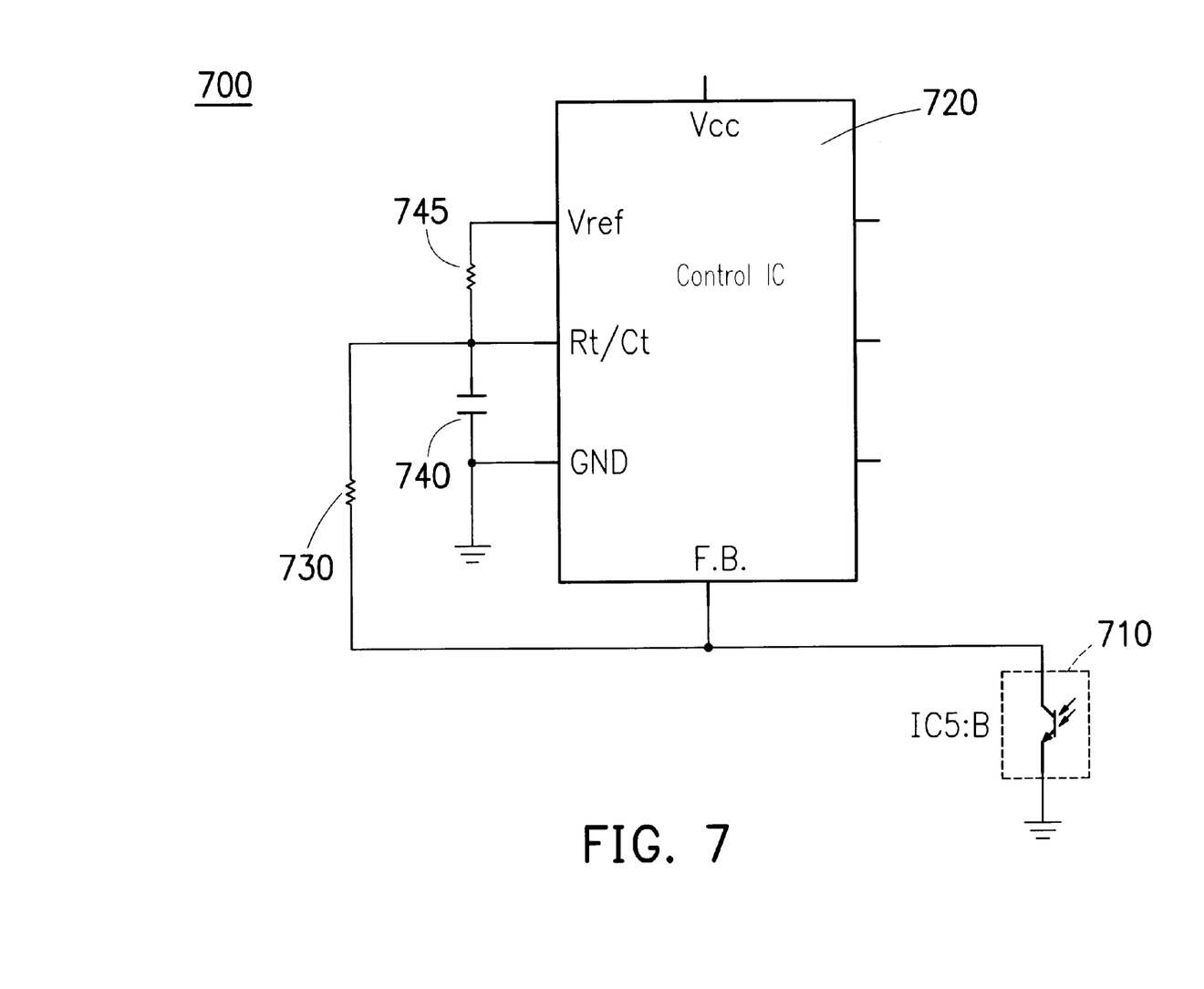
FIG. 7 shows the load-dependent frequency modulation circuit in a fifth embodiment of the invention.

FIG. 7 shows a third embodiment of the load-dependent frequency modulation circuit of the invention. The load-dependent frequency modulation circuit 700 includes a control integrated circuit 720, a resistor 730 used for the clock control circuit, and a RC circuit used as the clock generation circuit. The RC circuit has a resistor 745 and a capacitor 740. Two terminals of the resistor 745 are respectively coupled to a reference voltage node Vref, and the clock signal generation terminal Rt/Ct and one terminal of the capacitor 740. The other terminal of the capacitor is grounded (or connected to the ground terminal GND of the control integrated circuit 720). When the output feedback signal transmitted by the feedback circuit (photo-coupler 710) varies according to the magnitude of the load, the reference voltage Vref of the feedback signal and the control integrated circuit 720 generates a superposition effect on the clock generation circuit. As the load increases, the voltage of the feedback signal is increased with a limited maximum. When the load is small, the voltage of the feedback signal is low. The clock frequency generated by the control integrated circuit 720 is increased as the load increases, and decreased as the load decreases.

It is appreciated that though the reference voltage node is the reference voltage Vref on the control integrated circuit 720 in the above embodiment, it is not limited to only be the voltage node on the control integrated circuit 720. Instead, the reference voltage node can also be a voltage node for other devices or circuits such as the reference voltage node 550 in FIG. 5. In addition, the clock control circuit in the above embodiment only includes a simple resistor which cannot clearly distinguish between the sampling circuit and the frequency control circuit. However, the invention is not limited thereby. In fact, any circuits that can receive the feedback signal and affect the clock frequency of the clock signal generation terminal can be applied in this invention. For example, the transistor and other switch devices are all covered within the scope of the invention as the clock control circuit and clock generation circuit. Further, in addition to the RC circuit, the resistor-inductor (RL) circuit, and the resistor-inductor-capacitor (RLC) circuit can also be used as the clock signal generation circuit. Also, the clock control circuit can be a active circuit or a passive circuit.

According to the above, the invention has the following advantages. By using the clock control circuit and the clock generation circuit to adjust the clock frequency at the clock generation terminal, the operation frequency of the switching power system can be adjusted automatically according to the variation of load.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A load-dependent frequency modulation circuit applicable for a switching power system, comprising:
   a control integrated circuit, including a clock signal generation terminal and a feedback input terminal, wherein the clock signal generation terminal is used to generate a clock signal;
   a feedback circuit, to process an output of the switching power system and to obtain a feedback signal fed back to the feedback input terminal; and
   a clock control generation circuit, electrically connected to the feedback input terminal to adjust a clock frequency generated by the clock signal generation terminal according to a control signal generated by the feedback signal,
   wherein the clock control generation circuit further comprises:
      a clock control circuit, electrically connected to to feedback input terminal to change the control signal according to the feedback signal, wherein the clock control circuit comprises one selected from the group consisting of a resistor, a capacitor, and a inductor; and
      a clock generation circuit, electrically connected to the clock control circuit to receive the control signal, and to adjust the clock frequency generated by the clock signal generation terminal according to the control signal.

2. The load-dependent frequency modulation circuit according to claim 1, wherein the clock control circuit is an active circuit.

3. The load-dependent frequency modulation circuit according to claim 1, wherein the clock control circuit is a passive circuit.

4. The load-dependent frequency modulation circuit according to claim 1, wherein the clock control circuit further comprises:
   a sampling circuit, to output a sampling result for sampling the feedback signal; and
   a frequency adjust circuit, to receive the sampling result and to adjust the output control signal according to the sampling result.

5. A load-dependent frequency modulation circuit, applicable to a switching power system, comprising:
   a control integrated circuit, including a clock signal generation terminal and a feedback input terminal, wherein the clock signal generation terminal generates a clock signal;
   a feedback circuit, to process an output of the switching power system to obtain a feedback signal, and to feed back the feedback signal to the feedback input terminal;
   a resistor, with one terminal coupled to the feedback input terminal and the other terminal coupled to the clock signal generation terminal; and
   a capacitor, with one terminal coupled to the clock signal generation terminal and the other terminal grounded.

6. A load-dependent frequency modulation circuit, applicable to a switching power system, comprising:
   a control integrated circuit, including a clock signal generation terminal and a feedback input terminal, wherein the clock signal generation terminal generates a clock signal;
   a feedback circuit, to process an output of the switching power system to obtain a feedback signal, and to feed back the feedback signal to the feedback input terminal;
   a first resistor, with one terminal coupled to the feedback input terminal and the other terminal coupled to the clock signal generation terminal;
   a second resistor, with one terminal coupled to a reference voltage, and the other terminal coupled to the clock signal generation terminal; and
   a capacitor, with one terminal coupled to the clock signal generation terminal and the other terminal grounded.

7. A method of modulating switching frequency for a switching power system with a control integrated circuit that includes a clock signal generation terminal, the method comprising:
   obtaining a feedback signal from an output of the switching power system;
   referring to the feedback signal to adjust a clock signal generated by the clock signal generation terminal; and
   changing an operation voltage of a clock signal generation circuit according to the sampling result.

8. The method according to claim 7, wherein the step of referring to the feedback signal further comprises:
   sampling the feedback signal to obtain a sampling result; and
   transmitting the sampling result to the clock signal generation terminal.

9. The method according to claim 7, wherein the step of referring to the feedback signal further comprises:
   sampling the feedback signal to obtain a sampling result; and
   adjusting the clock signal generation terminal according to the sampling result.

10. A method of modulating switching frequency for a switching power system with a control integrated circuit that includes a clock signal generation terminal, the method comprising:
   obtaining a feedback signal from an output of the switching power system;
   sampling the feedback signal to obtain a sampling result; and
   processing the sampling result to obtain a superposition effect on the clock signal generation terminal.

* * * * *